(12) United States Patent
Marinelli et al.

(10) Patent No.: US 6,795,237 B1
(45) Date of Patent: Sep. 21, 2004

(54) OVERHEAD CONSOLE ACTIVE NIGHT VISION SYSTEM FOR AN INTERIOR CABIN OF A VEHICLE

(75) Inventors: Michael A. Marinelli, Northville, MI (US); Radek Zlamal, Windsor (CA)

(73) Assignees: Ford Motor Company, Dearborn, MI (US); Lear Corporation, Dearborn, MI (US)

(*) Notice: Subject to any disclaimer, the term of this patent is extended or adjusted under 35 U.S.C. 154(b) by 57 days.

(21) Appl. No.: 10/250,071

(22) Filed: Jun. 2, 2003

(51) Int. Cl.[7] .................................................. G02B 15/14
(52) U.S. Cl. ...................... 359/353; 359/354; 359/356; 359/357; 359/358; 359/359
(58) Field of Search ................................ 359/353–354, 359/356–359, 619, 625, 627–628, 726, 742; 307/101.1; 340/435

(56) References Cited

U.S. PATENT DOCUMENTS

| | | | | |
|---|---|---|---|---|
| 4,832,451 A | * | 5/1989 | Trescott | 359/641 |
| 5,268,570 A | * | 12/1993 | Kim | 250/214 VT |
| 5,414,439 A | * | 5/1995 | Groves et al. | 345/7 |
| 6,534,884 B2 | * | 3/2003 | Marcus et al. | 307/10.1 |
| 6,538,820 B2 | * | 3/2003 | Fohl et al. | 359/625 |

* cited by examiner

Primary Examiner—Mohammad Sikder
(74) Attorney, Agent, or Firm—Frank A. MacKenzie

(57) ABSTRACT

An illuminator system (16) for an interior cabin (12) of a vehicle (14) includes a light source (72) and a beam-forming optic (100) that is optically coupled to the light source. The optic (100) forms an illumination pattern (22) that is directed forward of the vehicle (14). A housing (58) supports the beam-forming optic (100) along a roofline (47) and window perimeter (48) of the vehicle (14).

25 Claims, 8 Drawing Sheets

OVERHEAD CONSOLE ACTIVE NIGHT VISION SYSTEM FOR AN INTERIOR CABIN OF A VEHICLE

BACKGROUND OF INVENTION

The present invention relates to night vision systems, and more particularly, to an illumination system of an active night vision system for an interior cabin of a vehicle.

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from objects within a particular environment. Active systems utilize a light source to illuminate a target area and subsequently detect infrared light reflected off objects within that area.

Passive systems typically use far-infrared cameras characterized by low resolution and a relatively narrow field-of-view. Such cameras must be located on the vehicle exterior in order to acquire requisite infrared energy in the operating environment. Externally mounted cameras can negatively affect vehicle styling. Far-infrared cameras are also costly to manufacture and generate images that have poor contrast, which can be difficult to interpret.

Active systems provide improved resolution and image clarity over passive systems. Active systems utilize laser or incandescent light sources to generate an illumination beam having near infrared light energy, and charged coupled devices or CMOS cameras to detect reflected infrared light. Active systems commonly deploy a light source external to the vehicle so as to transmit a significant amount of light energy and provide a bright scene for imaging.

Exterior mounted light sources or cameras are undesirable due to risk of damage during a vehicle collision. Night vision components are relatively expensive and, as a result, protection of the components is desired. Also, exterior mounted light sources and cameras are susceptible to theft. Additionally, external mounting of sources and cameras can limit and compromise vehicle design and styling, can be esthetically displeasing, and can increase exposure of the devices to dust and debris. Exposure to dust and debris negatively effects performance of the sources and cameras. When the sources and cameras are dirty, light transmission and reception can be substantially reduced and compromise system performance.

Exterior mounted illumination sources have additional associated disadvantages. A significant disadvantage is that of controlling the wavelength of the illumination beam. Diode lasers are sensitive to changes in temperature. The wavelength of a diode laser output shifts approximately 0.25 nm for every one-degree Celsius temperature change. Since external temperatures vary considerably it is difficult to control the temperature of a diode laser. Such temperature shifts can negatively affect performance of the night vision system. Also, when mounted externally, a risk of exposure to water exists, which can render the laser inoperable. Sealing and housing problems due to thermal energy management may also arise when weatherproofing diode lasers.

Furthermore, in designing a vehicle exterior, the external light source may have to be customized to satisfy styling requirements. Thus it is difficult to achieve commonality for light sources between different vehicles. Designing different light sources for different vehicles is costly.

Thus, there exists a need for an improved illumination system for an active night vision system of a vehicle, which minimizes illuminator system size and power consumption, as well as maximizes illuminator system optical and thermal efficiency.

SUMMARY OF INVENTION

The present invention provides an illuminator system for an active night vision system for an interior cabin of a vehicle. The illuminator system includes a light source and a beam-forming optic that is optically coupled to the light source. The optic forms an illumination pattern that is directed forward of the vehicle. A housing supports the beam-forming optic along a roofline and window perimeter of the vehicle.

One of several advantages of the present invention is that it provides an optically and thermally efficient illumination system that is located within an interior cabin of a vehicle. By the illumination system being located within the interior cabin, it is easier to control temperature of the light source and there is less risk of exposure to water or condensation.

Another advantage of the present invention is that it provides a light source and receiver mounting arrangement that maintains cleanliness of the light source and the receiver and provides a quality contrast image.

Furthermore, the present invention provides an efficient illumination system that is easy and inexpensive to manufacture and is reliable.

Moreover, the present invention provides a vision system that is compact in design and may be located in various locations within an interior cabin of a vehicle.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
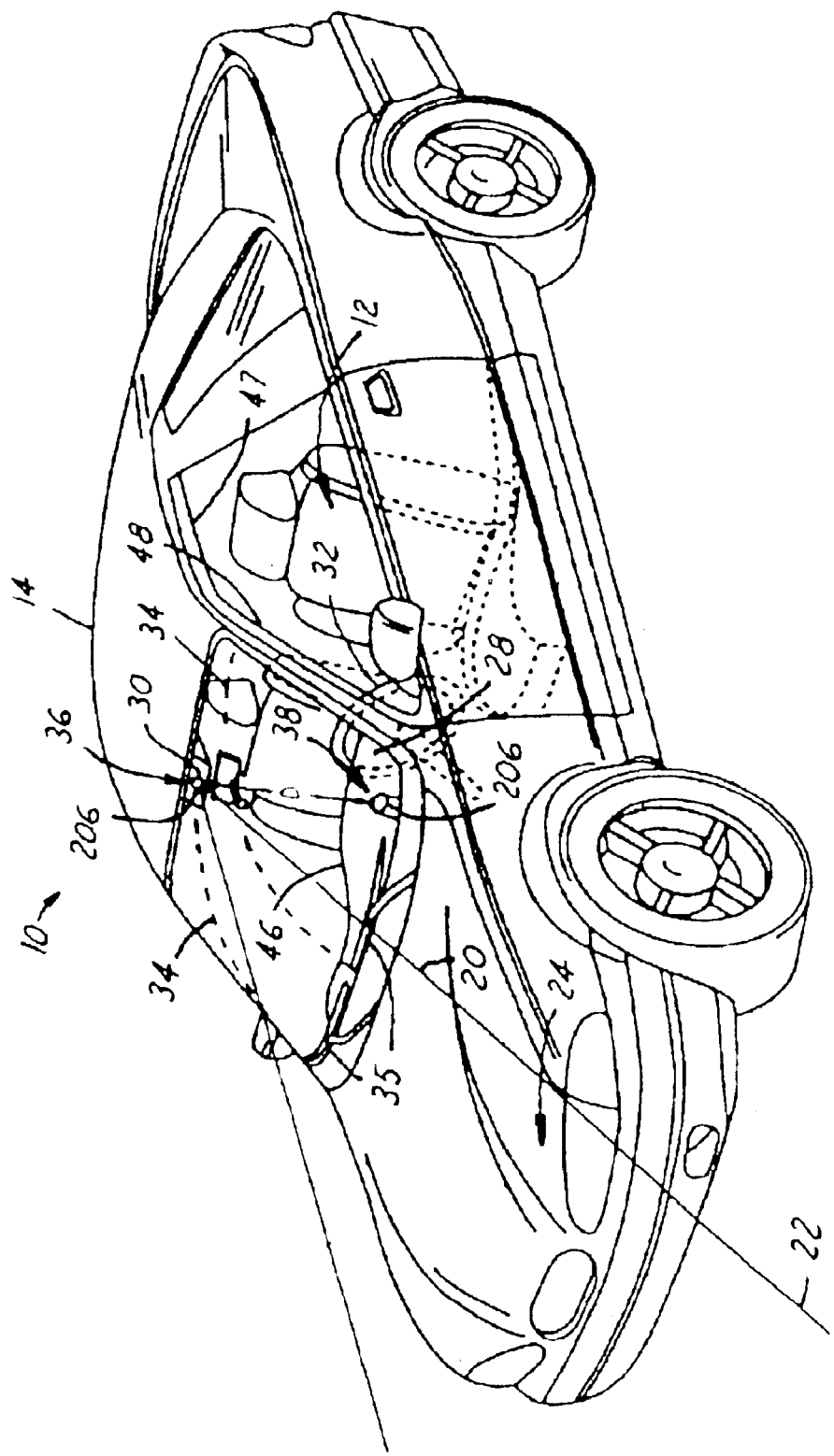
FIG. 1 is a front perspective view of an active night vision system for an interior cabin of a vehicle in accordance with an embodiment of the present invention.

In the following figures the same reference numerals will be used to refer to the same components. While the present invention is described with respect to an active night vision system for a vehicle, the present invention may be applied in various applications where near infrared imaging is desired, such as in adaptive cruise control applications, collision avoidance and countermeasure systems, and in image processing systems. The present invention may be applied during daytime hours or at night. The present invention may be applied in various types and styles of vehicles as well as in non-vehicle applications.

In the following description, various operating parameters and components are described for one constructed embodiment. These specific parameters and components are included as examples and are not meant to be limiting.

Also, in the following description the term "near infrared light" refers to light having wavelengths within the infrared light spectrum (750 nm to 1000 nm) and light having wavelengths near or just outside of the infrared light spectrum. The term also includes at least the spectrum of light output by the particular laser diode source disclosed herein.

Figure 2:
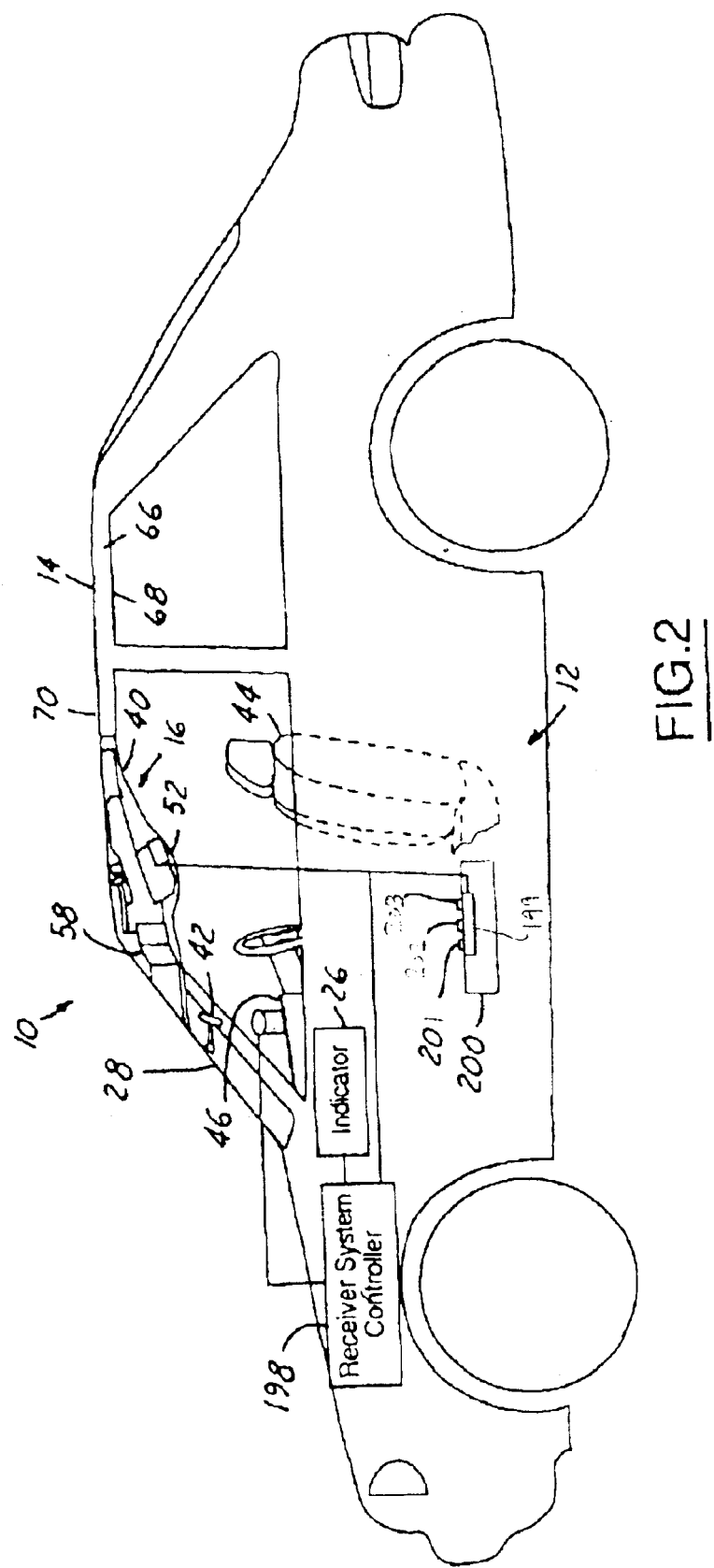
FIG. 2 is a side perspective and block diagrammatic view of an active night vision system in accordance with an embodiment of the present invention.

Referring now to FIGS. 1 and 2, front and side perspective views of an active night vision system 10 for an interior passenger cabin 12 of a vehicle 14 in accordance with an embodiment of the present invention are shown. The vision system 10 includes an illumination system 16 and a receiver system 18. The illumination system 16 generates an illumination beam 20 having a beam pattern 22, which is directed towards a target area 24 that is forward of the vehicle 14. Portions of the illumination beam 20 are reflected off objects (not shown) within the target area 24 and are received by the receiver system 18. The receiver system 18 indicates to vehicle occupants, via an indicator 26, detection of the objects in response to reflected portions of the illumination beam 20. The vision system 10 projects its illumination laser through the windshield 28. Reflections are likewise received by the receiver system 18 through the windshield 28. Some windshields contain IR blocking dopants (usually iron particles) or films to reduce the thermal load on the vehicle interior caused by sunlight. One such film is "XIR"Â® film produced by Southwall Technologies, Inc. To improve the transmission and reception of IR energy through the windshield 28, the dopant is left out or the film is cutout or also is left open in a transmission region 30 and a reception region 32 of the windshield 28 for the illumination beam 20 and reflected portions thereof to pass therethrough. In one example, film cutouts closely correspond to the openings defined by the light shroud and camera, which are described in more detail below. The vision system 10 may be modified for transmission and reception of the illumination beam 20 through any region on any window of the vehicle 14, which will become more evident in light of the following description.

The illumination system 16 and the receiver system 18 are configured and positioned to transmit the illumination beam 20 and receive reflected portions thereof within wiper-zones 34 of the windshield 28 which are cleared by wipers 35. Since the wiper-zones 34 are typically clean to provide a clear view of the environment external to the vehicle 14, transmission and reception of the illumination beam 20 is minimally impeded or affected by dirt, debris, rain, or snow, unlike conventional night vision systems.

Separation distance D between the emitted output 36 of the illumination assembly 16 and received input 38 of the receiver assembly 18 is preferably greater than approximately 30 cm. In one embodiment of the present invention the separation distance D is approximately 50 cm. Maintaining a minimum separation distance is desired to prevent reception of a high level of light reflection and glare from highly reflective objects, such as road signs, in the target area 24. When the emitted output 36 is positioned too close to the received input 38 high levels of reflected light can "drown out" desired reflected portions of the illumination signal from objects within the target area 24 and negatively effect image quality of the receiver system 18. Although, a minimum separation distance is preferred, the emitted output 36 and the received input 38 may be in close proximity to each other, in other words, having a separation distance of less than 30 cm. In such cases, the power of the illumination beam 20 may be reduced, post processing of the reflected portions may be required, or post-image manipulation may be performed to provide an image of adequate quality. Different gating techniques may also be employed for the emitter and receiver to minimize display saturation by stray reflections.

The illumination system 16 is configured to be mounted within an overhead console 40 above a rearview mirror 42, and the receiver system 16 is configured to be mounted forward of a driver seat 44 on a dashboard 46, thereby providing a desired minimum separation distance between the emitted output 36 and the received input 38.

The illumination system 16 may be mounted along the front roofline 47 or along any perimeter 48 of the windshield 28, and the receiver system 18 may be located on the dashboard 46, as shown. Both systems 16 and 18 may be located in other various locations within the interior cabin 12. For example, the illumination system 16 and receiver system 18 may be mounted in other locations around the windshield 28 or any other window within the vehicle 14.

Figure 3:
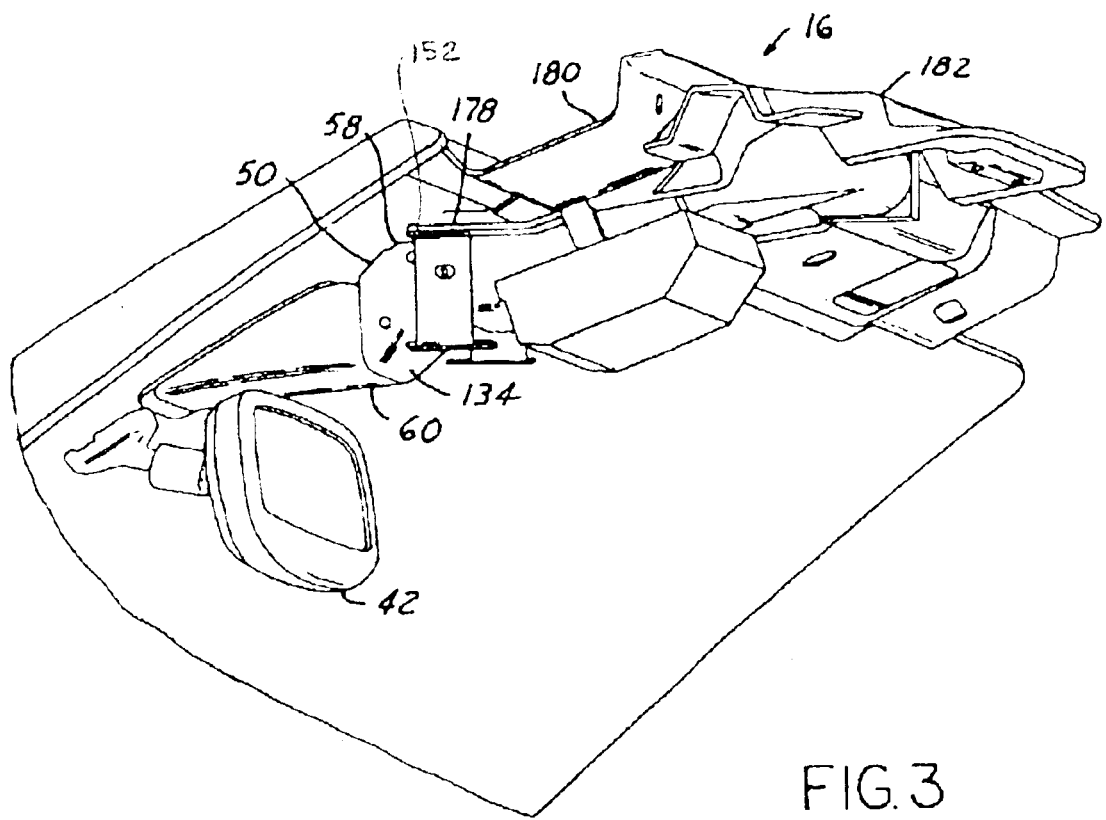
FIG. 3 is a left side perspective view of an illuminator system in accordance with an embodiment of the present invention.
Figure 4:
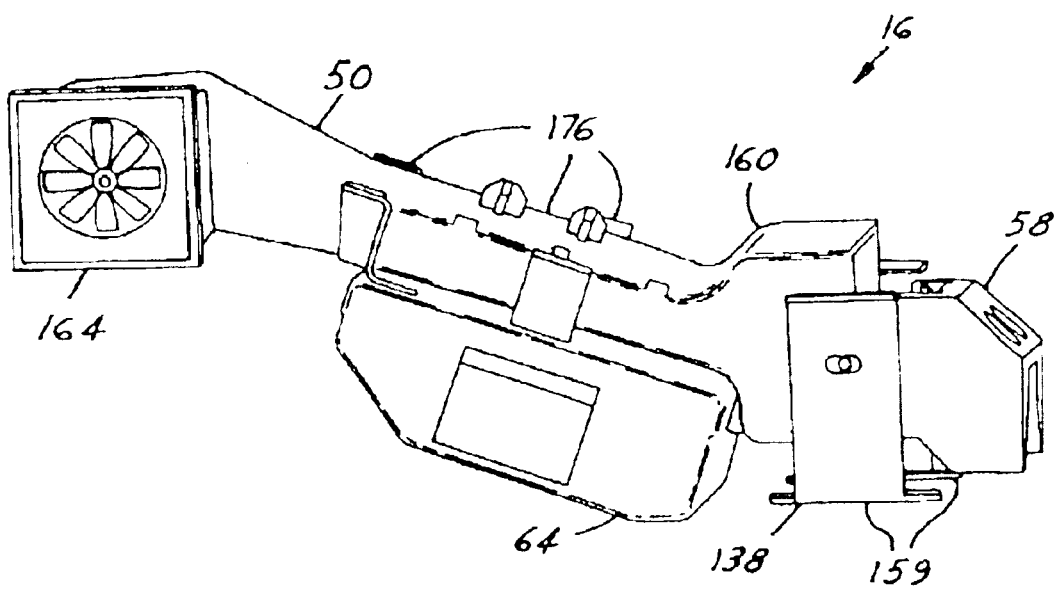
FIG. 4 is a right side perspective view of the illuminator system in accordance with an embodiment of the present invention.
Figure 5:
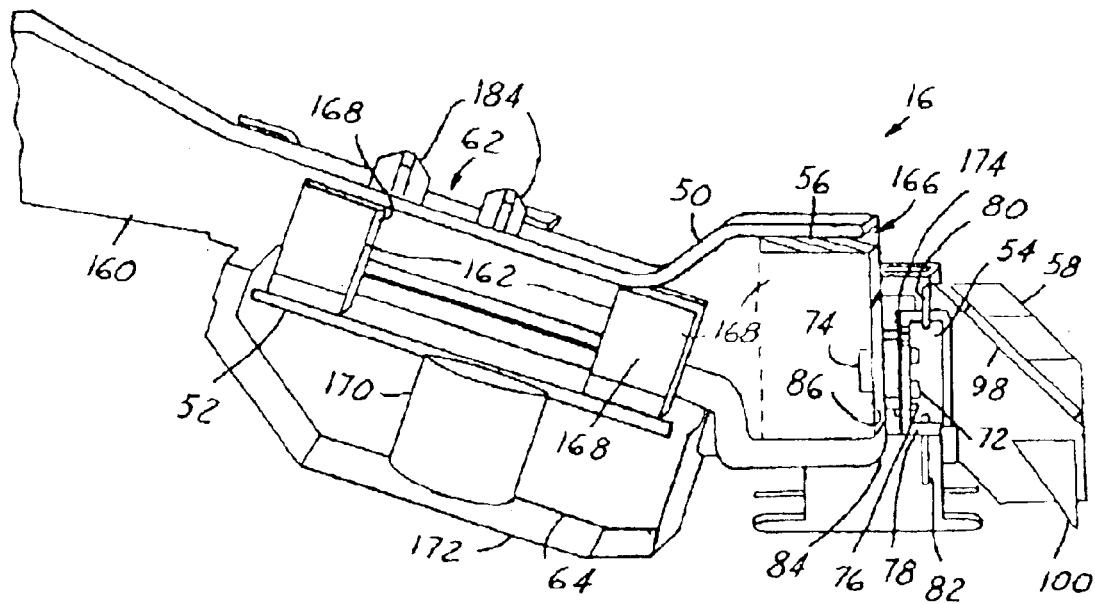
FIG. 5 is a cross-sectional view of the illuminator system shown in FIG. 4.

Referring now also to FIGS. 3–5, perspective and cross-sectional views of the illumination system 16 are shown in accordance with an embodiment of the present invention. The illumination system 16 includes an illumination assembly 50 and an illumination controller 52. The illumination assembly 50 includes a light source assembly 54 that generates light, which may be emitted from the assembly in the form of an illumination beam, such as beam 20. The light assembly 54 is coupled between an illuminator heat sink 56 and a component alignment-maintaining module 58. Light generated from the light assembly 54 is directed through the module 58 where it is reflected and/or collimated to generate the illumination pattern 22. The illumination beam 20 is emitted from the light assembly 54 and passed through a light shroud assembly 60 and through the windshield 28. A cooling system 62 resides over the heat sink 56 and over a power supply 64 for thermal cooling thereof. The cooling system 62 circulates air around the heat sink 56 across the power supply 64, and into an air gap 66 between a headliner 68 and a roof 70 of the vehicle 14, thereby cooling the heat sink 56 and the power supply 64.

The light source assembly 54 includes a light source 72 and may include a heater 74 and a thermistor 76, which may be contained within a light source housing 78. In the embodiment as shown the heater 74 is external and separate from the housing 78. The light source 72 generates light using power received from the power supply 64, via power supply leads 80. The heater 74 and thermistor 76 are utilized in controlling temperature of the light source 72, via heater and thermistor leads 82. The heater 74 increases temperature of the light source 72 in response to a temperature signal generated by the thermistor 76. The light source 72 also receives an illumination signal from the illumination controller 52. Intensity of the illumination beam 20 is directly proportional to voltage of the illumination signal. By having the heater 74 and the thermistor 76 within the illumination assembly 16, the temperature of the light source 72 may be controlled without adjusting the temperature within the interior cabin 12.

The light source 72 may be of various type and style. Diode lasers are preferred over incandescent light sources for several reasons. Incandescent light sources are not monochromatic like diode lasers, but instead emit energy across a large spectrum, which must be filtered to prevent glare onto oncoming vehicles. Filtering a significant portion of energy from a bulb is expensive, energy inefficient, and generates undesired thermal energy. Also, filter positioning is limited in incandescent applications, since the filter must be located proximate an associated light source. As well, multiple incandescent sources are often required to provide requisite illumination, thus increasing complexity and costs. In one embodiment of the present invention the light source 72 is a near infrared diode laser, having desired monochromatic and illumination characteristics. The diode laser may, for example, be a Single Stripe Diode Laser, Model No. S-81-3000-C-200-H manufactured by Coherent, Inc. of Santa Clara, Calif.

The heat sink 56 may be of various size, type, and style known in the art. The heat sink 56 includes a thermal coupler layer 84 that covers a forward surface 86 of the heat sink 56 that resides between the heat sink 56 and the light source 72. The thermal coupler layer 84 provides an efficient thermal transport between the light source 72 and the heat sink 56. The thermal coupler layer 84 may be formed of indium or of some other material having similar thermal properties.

Figure 6:
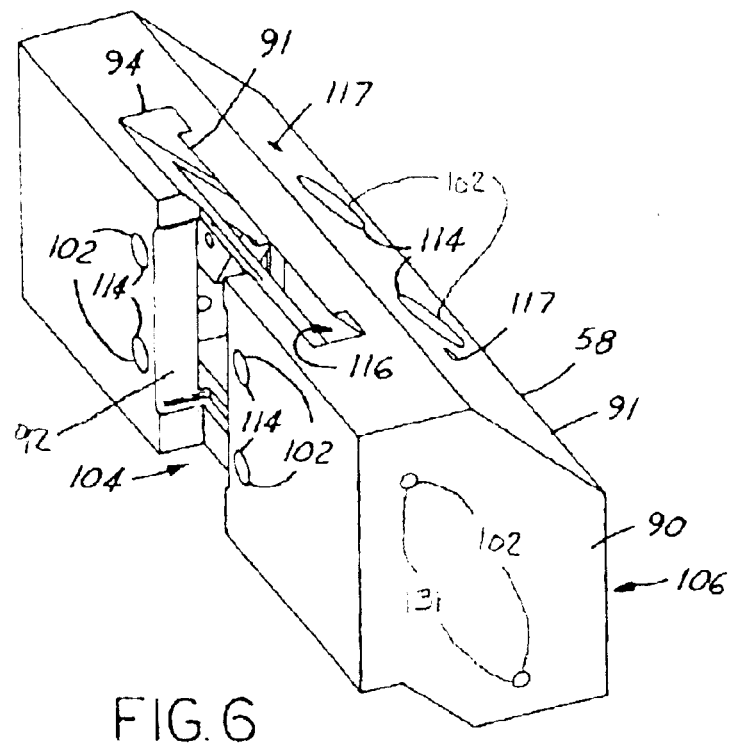
FIG. 6 is a right rear perspective view of the component alignment maintaining module in accordance with an embodiment of the present invention.
Figure 7:
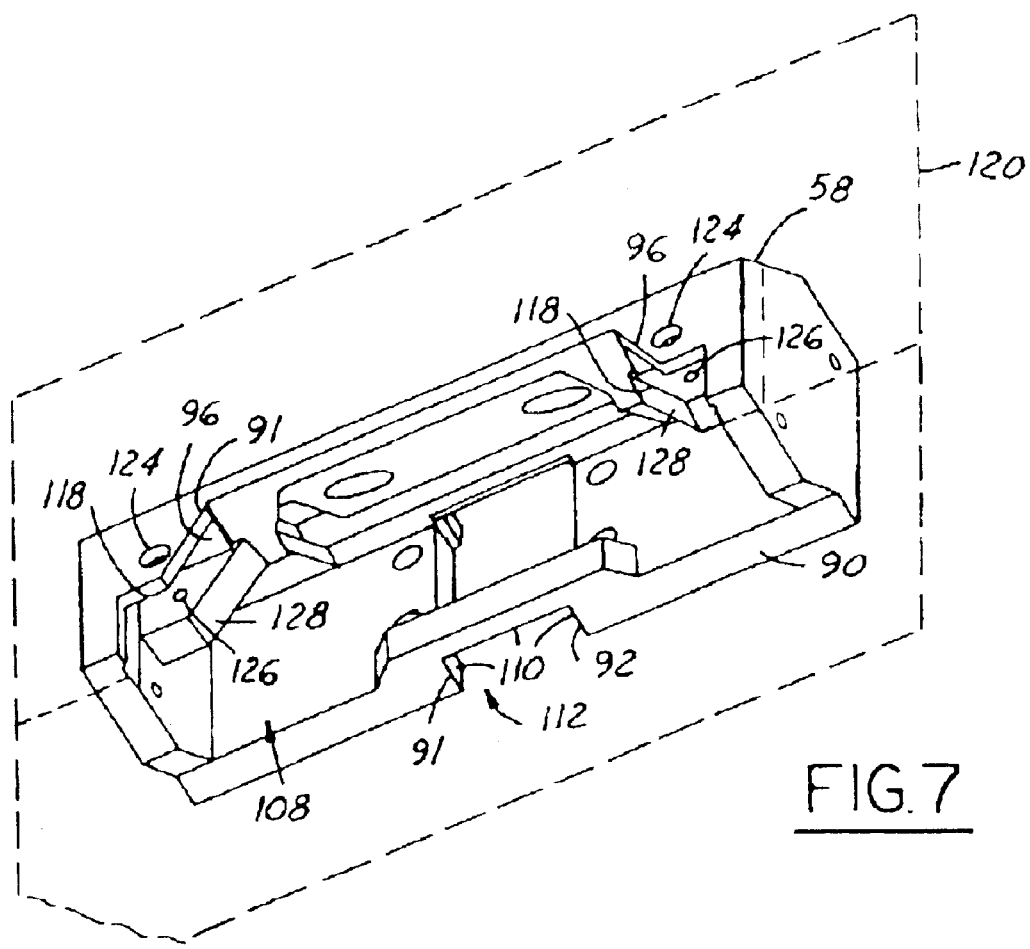
FIG. 7 is a front bottom perspective view of the component alignment maintaining module shown in FIG. 6.

Referring now also to FIGS. 6 and 7, perspective views of the module 58 are shown in accordance with an embodiment of the present invention. The module 58 includes a body 90 that has multiple guides 91, including a light source guide 92, a light coupler guide 94, and a beam-forming optic guide 96 for guiding, rigidly fixing, and maintaining alignment of the light source 72, a light coupler 98, and a beam-forming optic 100, respectively. The body 90 also has multiple supports 102 that are configured to support the light source 72, the light coupler 98, and the beam-forming optic 100 along the forward headliner region of the vehicle such as the windshield perimeter 48. The module 58 has an illumination beam inlet 104 that is offset from an illumination beam outlet 106. Light from the light source 72 is generated proximate to, and emitted horizontally through, the inlet 104. It is then reflected downward by the light coupler 98 to the optic 100, where it is again reflected towards and through the light shroud assembly 60, out the outlet 106. The module 58, in its most simplified form, may be referred to as a housing that supports the light source 72 and the optic 100 near a window perimeter, such as the perimeter 48.

The body 90 in combination with the light shroud assembly 60 (FIG. 10) provides an optically sealed cavity 108, which minimizes entrance of dust and debris, thereby minimizing maintenance of the light source 72, the light coupler 98, and of the optic 100. The sealed cavity 108 also prevents eye exposure to light from the light source 72. The body 90 may be of various size, shape, style, and be formed of various materials known in the art. The body 90 may be formed of various materials including plastic and metal, such as aluminum, steel, and magnesium, as well as other materials known in the art. The body 90 when formed of a metal may also perform as a heat sink. The body 90 in one embodiment of the present invention is opaque so as to prevent light from entering or exiting the cavity 108.

The guides 92, 94, and 96 are configured to maintain alignment of the light source 72 in relation to the light coupler 98 and the optic 100. The guides 92, 94, and 96 due to their corresponding shapes, sizes, and arrangement aid in assembly and rigidly fixing the light source 72, the light coupler 98, and the optic 100 to and within the module 58.

The light source guide 92 has three sides 110 with matching dimensions and contours to that of the light source housing 78 and aids in aligning and rigidly fixing the housing 78 to the module 58. The three sides 110 form an open channel 112, which holds the housing 78.

Figure 8:
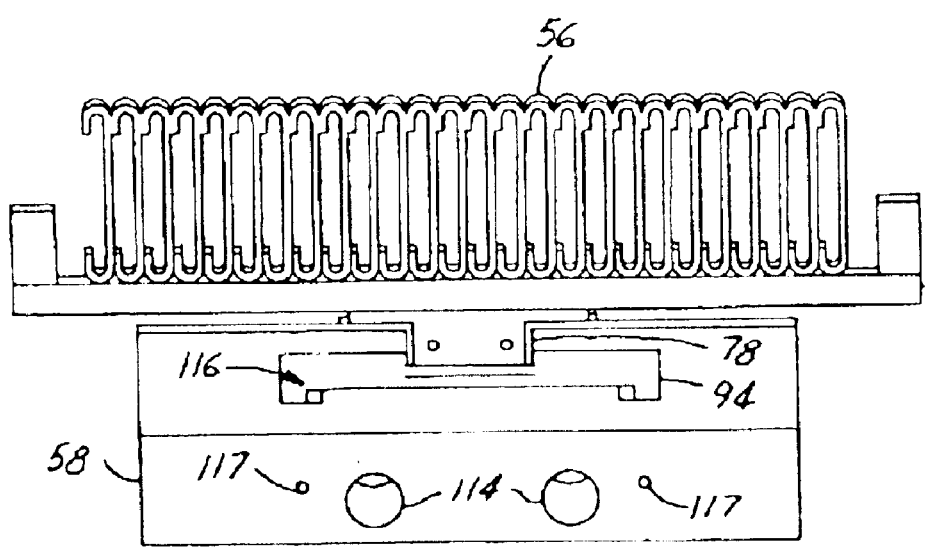
FIG. 8 is a top view of the component alignment maintaining module of FIG. 6 and a light source heat sink in accordance with an embodiment of the present invention.

The light source guide 92 along with fastener apertures 114 aid in aligning and fastening the heat sink 56 and the light source 72 to the module 58. During assembly, fasteners (not shown) are extended through the apertures 114, through the housing 78, and threaded into the heat sink 56, locking the light source 72 and the heat sink 56 to the module 58. Relative spatial relation between the housing 78, the heat sink 56, and the module 58 is best seen in FIG. 8.

The light coupler guide 94 is in the form of a pocket or slot 116 within the module 58. The slot 116 is shaped to correspond with shape of the light coupler 98 and is positioned at approximately a 45 Â° angle relative to the light source guide 92. The light coupler 98 during assembly is slid into the slot 116 and fastened to the module 58 in one of various positions using light coupler fasteners (not shown) extending through apertures 117. Instead of the fasteners extending through the apertures 117, the light coupler 98 may be fastened to the body 90 using spring clips (not shown) or the like. Although the light coupler guide 94 is shown as a stationary fixed device that is coupled to or integrally formed with the body 90, the light coupler guide 94 may be part of a light coupler position adjusting assembly (not shown) for mechanically or electronically controlling position of the light coupler 98, using techniques known in the art.

The beam-forming optic guide 96 is in the form of corner channels 118, which are angled to be approximately 45 Â° with respect to the light coupler guide 94, and to be parallel with a datum plane 120 that extends outward. therefrom. During assembly, corner portions 122 of the optic 100 are slid into the channels 118 where they are held therein, via fasteners (not shown) extending through apertures 124 of the channels 118, through the corner portions 122, and threaded into holes 126 in inner sides 128 of the channels 118.

The light coupler 98 may be in the form of a mirror, as shown, a series of mirrors, a fiber optic cable, or other reflective or light transporting device known in the art. In the embodiment as described, light is emitted from the light source 72 in the form of an elliptically shaped beam with a spread angle of approximately 20–50 Å°, which is then reflected at approximately a 90 Å° angle downward by the light coupler 98 to enter the optic 100. Although, the present invention is described with respect to the incorporated use of a light coupler, the present invention may be modified to have direct emission of light between the light source 72 and the optic 100, without use of a light coupler 98.

Although, the optic 100 is preferably a thin sheet optical element, it may be in some other form. Continuing from the above-described embodiment, the optic 100 expands and reflects the light generated by the light source 72 at approximately a 90 Å° angle to direct the light forward of the vehicle 14. Light from the light source 72 enters and is reflected by the optic 100, and is then reflected through a front surface 130 to be emitted through the windshield 28. Also, although a single optic is shown, additional optics may be incorporated within the illumination system 16 or within the module 58 to form a desired beam pattern onto a target external from the vehicle 14.

The optic 100 may be formed of plastic, acrylic, or of some other similar material known in the art. The optic 100 can utilize the principle of total internal reflection (TIR) and form the desired beam pattern with series of stepped facets; An example of a suitable optical element is disclosed in U.S. patent application Ser. No. 09/688,982 entitled "Thin-Sheet Collimation Optics For Diode Laser Illumination Systems For Use In Night-Vision And Exterior Lighting Applications." The supports 102 include apertures 114 and side apertures 131. Apertures 131 extend through the shroud assembly 60 and the body 90. The apertures 114 and 131 allow the module 58 to be couple to adjacent components within the illumination assembly 16 for support of the light source 72, the light coupler 98, and the beam-forming optic 100 along the upper portion of the windshield opening 48. The apertures 114 and 131 may be in some other form of support known in the art. The module 58 may also include other supports in addition to, or in replacement of, the supports 102.

Figure 9:
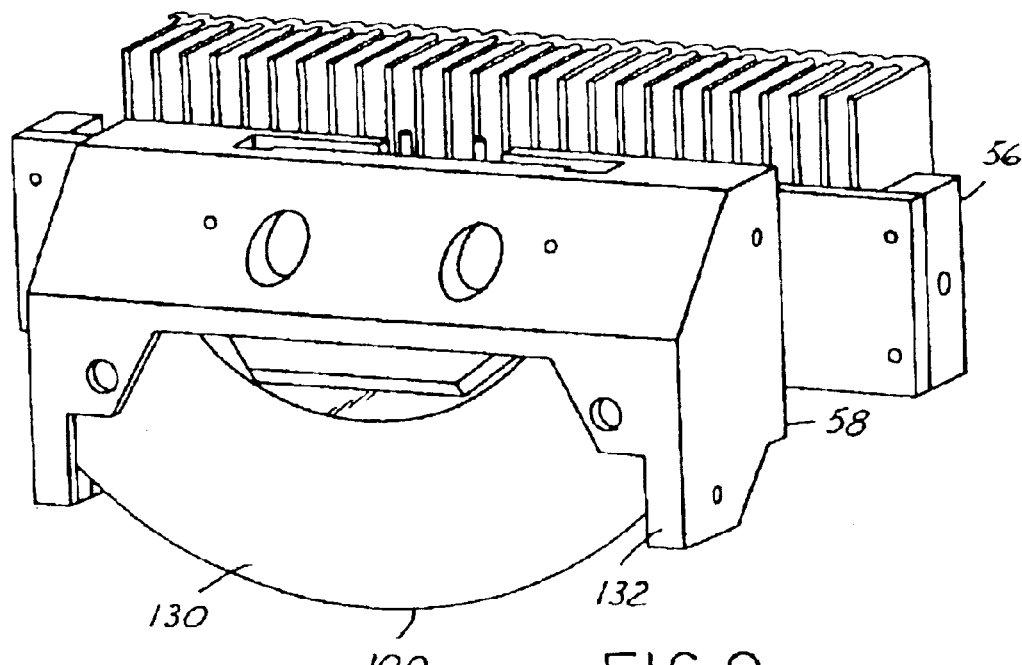
FIG. 9 is a left front perspective view of the component alignment maintaining module of FIG. 6, including a light source and a heat sink in accordance with an embodiment of the present invention.

A forward exterior surface 132 of the module 58 also performs as a guide in fastening the light shroud assembly 60 to the module 58. The exterior surface 132 is similar in dimension to, and slides within, a rear portion 134 of the light shroud assembly 60. Fasteners (not shown) extend through apertures 131 in the light shroud assembly 60 and are threaded into the module 58. The exterior surface 132 of the module 58 is best seen in FIG. 9.

The module 58 provides for easy and accurate aiming of the illumination beam 20 by providing the guides 91 to appropriately position the light source 72, the light coupler 98, and the optic 100. The module 58, in providing accurate alignment of the illumination beam 20, assures adequate light throughput and precise illumination of the target area 24. Open configuration of the module 58 provides adequate airflow for thermal dissipation of the light source 72. Air enters the inlet, circulates around the light source 72, and passes over the heat sink 56.

Figure 10:
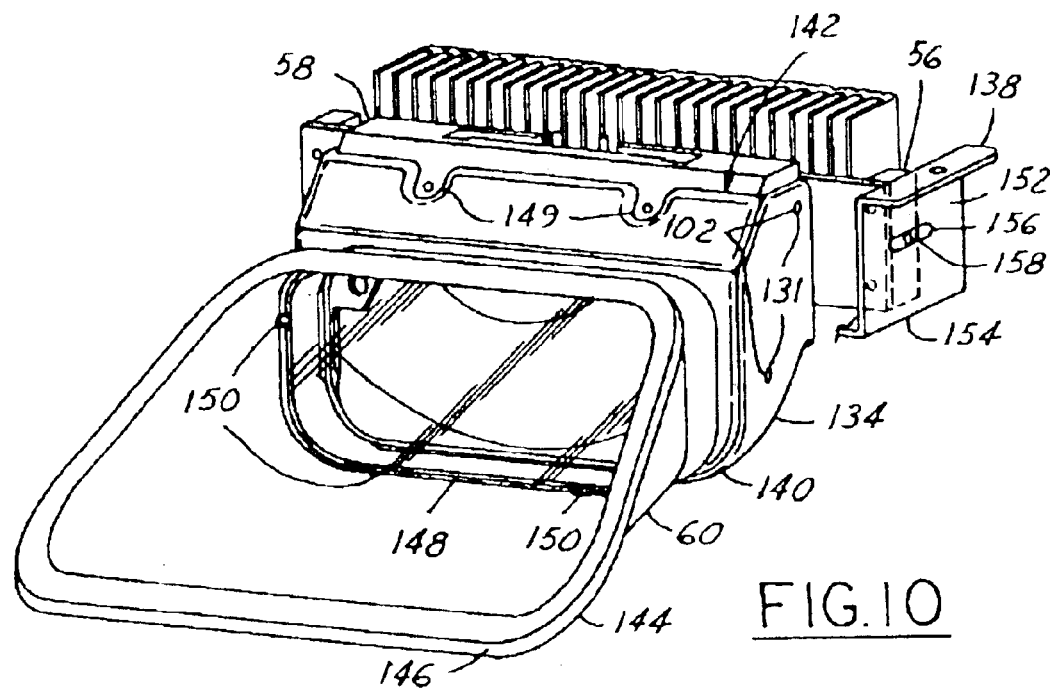
FIG. 10 is a left front perspective view of the assembly of FIG. 9 including a light shroud and an alignment-mechanism in accordance with an embodiment of the present invention.

Referring now to FIG. 10, a left front perspective view of the heat sink 56, the module 58, the light shroud assembly 60, and an alignment-mechanism 138 in accordance with an embodiment of the present invention is shown. The light shroud assembly 60 includes a light shroud 140 that, as stated-above, is coupled over and forms a light-tight seal 142 with the module 58. A forward portion 144 of the light shroud 140 mates with, and is sealed to, the windshield 28, via a light seal 146. Coupling of the light shroud 140 to the module 58 in combination with use of the seal 146 prevents near infrared light from straying or being reflected into the interior cabin 12. The light shroud assembly 60 can also include a diffuser 148, as shown, which is clipped into the forward portion 144 of the shroud, via tabs 150. The diffuser 148 refracts the light to limit the focused intensity of the illumination beam 20 when exiting the light shroud 140. The position of the light coupler 98 may be adjusted even after coupling of the light shroud assembly 60 to the module 58, by way of notches 149 in the rear portion 134 that allow access to fasteners (not shown) extending through the apertures 117.

The alignment-mechanism 138 is utilized for transmission alignment of the illumination beam 20. The alignment-mechanism 138 includes a "U" shaped hanging bracket 152, which is shaped to overhang shoulders 154 of the heat sink 56, and has a pair of horizontal adjustment slots 156. A pair of fasteners (not shown) extend through the slots 156 and are threaded into tapped holes 158 in sides of the heat sink 56. The U-bracket 152 may be split into two halves 159, as shown in FIG. 4, or may be a single integrated unit. The attachment-mechanism 138 allows the heat sink 56 to be rotated vertically and shifted horizontally relative to the U-bracket 152. Of course, other shaped brackets and bracket combinations may be utilized as well as other attachment-mechanisms known in the art.

The seal 146 may be in various forms and may be formed of various materials. The seal 146 for example, may be formed of rubber and be in the form of a gasket or gimp. The seal 146 also compensates for design variations in vehicle components, such as in the illumination assembly 16 and the windshield 28, by being compressible and tightly forming between the light shroud 140 and the windshield 28, assuring a light-tight seal.

The diffuser 148 provides uniformity of light emitted from the light shroud assembly 60. The diffuser 148 may be applied directly to the optic 100 or may be omitted from the system 10. The illumination beam 20 may be uniformly emitted from the light shroud assembly 60 using other beam shaping and controlling techniques known in the art.

Referring again to FIGS. 3–5, the cooling system 62 includes an air conduit 160 that resides over the heat sink 56 and over a pair of power supply heat sinks 162 of the power supply 64. A cooling fan 164 is coupled to the air conduit 160 and circulates air around a perimeter 166 of the heat sink 56, across cooling fins 168 of the heat sink 56 and 162, and disperses thermal energy from the heat sinks 56 and 162 into the air gap 66. In cooling the heat sinks 56 and 162, the light source 72 and the power supply 64 are also cooled.

The power supply 64 may also be of various size, shape, and style as known in the art. The power supply 64 includes the pair of heat sinks 162, the illumination controller 52, a capacitor 170, and a power supply protective housing 172. This unique combination of the controller 52, the power supply 64, and the heat sinks 162 in combination with the close proximate location of each device relative to the light source 72 provides several advantages. It is an efficient technique for providing power to the light source 72 without power fluctuations or variations, providing efficient cooling of the controller 52 and the power supply 64, and it is a compact design for versatile use in various vehicle interior cabin locations without obstructing the view of a vehicle occupant. The capacitor 170 provides low voltage and high current used by the light source 72. The power supply 64 may also include an electromagnetic shield (not shown)

shielding the power supply 64 from other electronic devices contained within the vehicle 14.

In addition to the above-stated components and devices of the illumination system 16, a focal point adjuster 174 may be used, as shown, between the heat sink 56 and the light source 72 to adjust the focal point of the illumination beam 20 out of the light source 72. The focal point adjuster 174 may be in the form of one or more shims, as shown, or may be in some other form known in the art.

The illumination assembly 16 is coupled to the roof 70, via the U-bracket 152 and support brackets 176. The U-bracket 152 is coupled to an extension bracket 178, which is in turn coupled to a structural frame 180. The support brackets 176 are coupled to the illumination assembly 16 and to the frame 180. The cooling system 62 is shaped to reside within an overhead console bracket 182, which is also coupled to the frame 180. The illumination assembly 16 may also include attachment points or locators, such as locators 184, to aid in installation thereof.

Although the illumination-system 16 is described with respect to being utilized within an overhead console, due to its low profile design, it may be incorporated into other integrated vehicle interior clusters. The illumination system 16 may be incorporated within the pillars of a vehicle, such as an "A"-pillar, in a dashboard, in various headliner locations, in a door panel, or in other locations proximate to a perimeter of a window.

The illumination system 16 allows for quick, easy, and precise aiming of the light source 72, without affecting alignment of the light source 72 relative to the light coupler 98 and the optic 100, and without affecting thermal geometry for desired cooling within the vision system 10.

The above-described components and features of the illumination system 16 are meant for example purposes only, the illumination system 16 may include other additional components or features as are known in the art.

Figure 11:
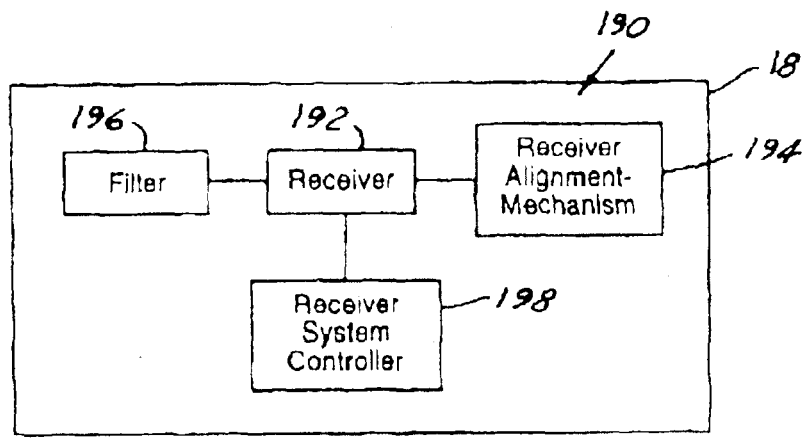
FIG. 11 is a block diagrammatic view of a receiver system in accordance with an embodiment of the present invention.

Referring now to FIG. 11, a block diagrammatic view of the receiver system 18 in accordance with an embodiment of the present invention is shown. The receiver system 18 includes a receiver assembly 190 having a receiver 192, a receiver alignment-mechanism 194, a filter 196, and a receiver system controller 198. The receiver 192 may be in the form of a charge-coupled device (CCD) camera or a complementary metal oxide semiconductor (CMOS) camera. A CCD camera, Model No. Wat902HS manufactured from Watec America Corporation of Las Vegas, Nev. may, for example, be used as the receiver 192. Near infrared light reflected off objects is received by the receiver 192 to generate an image signal. The filter 196 is used to filter the reflected near infrared light. The filter 196 may be an optical bandpass filter, which allows light within a near infrared light spectrum to be received by the receiver 192, which preferably corresponds with wavelength of light contained within the illumination signal 20. The filter 196 may be separate from the receiver 192, as shown, or may be in the form of a coating on a lens of the receiver 192.

The receiver alignment-mechanism 194 may be used to adjust reception angle of the reflected illumination beam 20. The receiver alignment-mechanism 194 may allow for manual adjustment of the reception angle or may be motorized and/or electronically controlled via the receiver controller 198.

The receiver assembly 190 may include a device (not shown) for adapting receiver sensitivity to light to correspond with ambient luminosity. Also, the light source 72 and/or the receiver 192 may be in optical communication with a target vehicle (not shown).

Referring again to FIGS. 3–5, the controllers 52 and 198 are preferably microprocessor based such as computers having central processing units, memory (RAM and/or ROM), and associated input and output buses. The controllers 52 and 198 may be application-specific integrated circuits or may be formed of other logic devices known in the art. The controllers 52 and 198 may be a portion of a central vehicle main control unit, an interactive vehicle dynamics module, a restraints control module, a main safety controller, may be combined into a single integrated controller, or may be stand-alone controllers as shown.

The illumination controller 52 controls operation of the light source 72 and the power supply 64 whereas the receiver controller 198 controls operation of the receiver 192, the filter 196, and the receiver alignment-mechanism 194. The controllers 52 and 198 may be coupled to vision system controls 199, as are shown in FIG. 2, which are mounted on a center console 200. The system controls 199 may include an activation switch 201, a light coupler position adjuster control 202, and an illumination beam brightness control 203.

The activation switch 201 may be used to activate the vision system 10 manually or the vision system 10 may be internally activated by one of the controllers 52 or 198. The vision system 10 may also be activated through use of a voice activation system (not shown). The light coupler control 202 may be coupled to a light coupler motor (not shown) for adjusting alignment angles of the light coupler 98 relative to the light source 72 and the optic 100. The brightness control 203 may be used for adjusting illumination beam 20 intensity, which in turn adjusts indication signal brightness or clarity on the indicator 26.

The indicator 26 may include a video system, an audio system, an LED, a light, global positioning system, a heads-up display, a headlight, a taillight, a display system, a telematic system or other indicator known in the art. The indicator 26 may indicate position, range, and traveling speed relative to the vehicle, as well as other known object parameters or characteristics. Objects may include any animate or inanimate objects including pedestrians, vehicles, road signs, lane markers, and other objects known in the art. In one embodiment of the present invention the indicator 26 is in the form of a heads-up display and the indication signal is projected as to appear being forward of the vehicle 14. The indicator 26 provides a real-time image of the target area as to increase visibility of objects during relatively low visible light level conditions without having to refocus ones eyes to monitor a display screen within the interior cabin.

The indicator 26 may include a screen cold temperature operation liquid-crystal display (LCD), a video controller, a field mirror, as well as other heads-up display related components known in the art. The indicator 26 may mimic a road scene in a manner allowing a vehicle operator to quickly and easily transition between the indicator 26 and the windshield 28. The indicator 26 and the receiver assembly 18 may be separate or part of a single package. The indicator 26 may include an opaque curved mirror. When not in use the indicator 26 may retract into the dashboard 46. The indicator 26 may have varying resolution and field-of-view size and may display objects having varying apparent size.

The windshield 28 as stated above contains an XIRÂ® film or the like, which performs as a near infrared absorber or reflector preventing transmission of near infrared light through the windshield. The XIRÂ® film is manufactured by Southwall Technologies, Inc. Although, an XIRÂ® film is used, other IR reflecting layers may be incorporated, such as those formed using a sputtering process, as known in the art. The windshield when manufactured includes a pair of cutouts 206 where the XIRÂ® film is left open in a transmission region 36 and reception region 38 of the windshield for the illumination beam 20 and the reflected portions thereof to pass therethrough. Also, there may exist multiple IR layers within the windshield 28 each having been left open in the transmission region 36 and the reception region 38.

The vision system 10 may also incorporate use of a color corrected light source and corresponding control circuitry (not shown). The light source and the control circuitry may be incorporated into the module 58. The control circuitry may also be incorporated into either one of the controllers 52 and 198. For a further detailed explanation of the color corrected light source or of the control circuitry see U.S. patent application Ser. No. 10/064,116, entitled "Color Corrected Laser Illumination System for Night Vision Applications", filed Jun. 12, 2002 and incorporated by reference herein.

Figure 12:
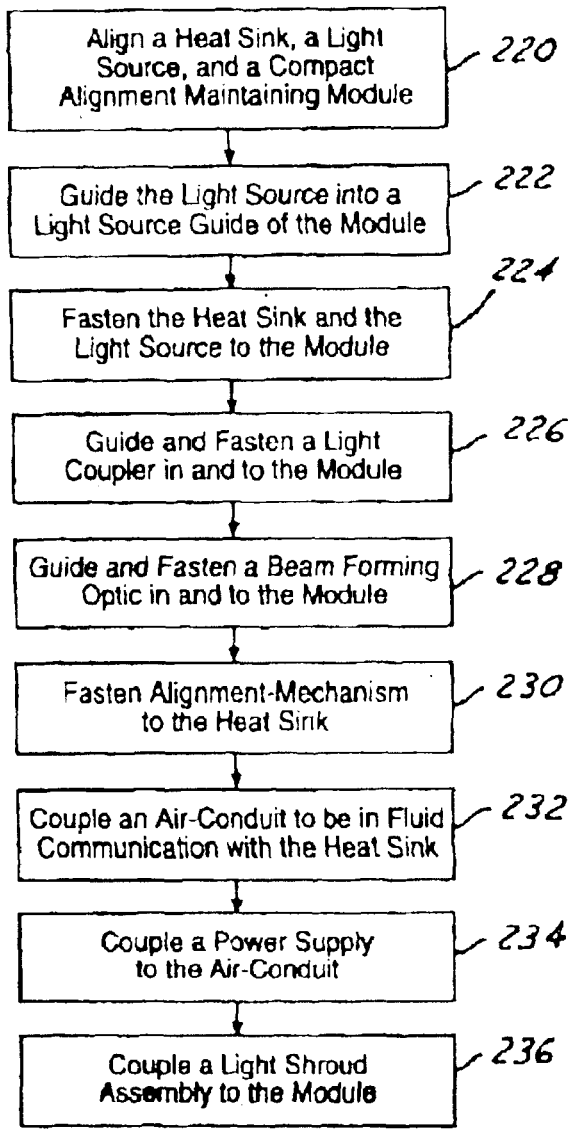
FIG. 12 is a logic flow diagram illustrating a method of assembling the illuminator system of FIGS. 3–5 in accordance with an embodiment of the present invention.

Referring now to FIG. 12, a logic flow diagram illustrating a method of assembling the illuminator system 16 in accordance with an embodiment of the present invention is shown.

In step 220, the heat sink 56, the light source 72, and the module 58 are aligned in relation to each other. The focal point adjuster 174 may also be aligned relative to the light source 72. In step 222, the light source 72 is guided into the light source guide 92 of the body 90. In step 224, the heat sink 56 and the light source 72 are fastened to the body 90. When utilized, the focal-point adjuster 174 may also be fastened to the body 90.

In step 226, the light coupler 72 is guided in to the body 90, via the light coupler guide 94 and is aligned with the light source 72 and fastened to the body 90. In step 228, the optic 100 is guided into the body 90 and aligned with the light coupler 98, via the channel guides 96, and fastened to the body 90.

In step 230, the alignment-mechanism 138 is fastened to the heat sink 56. In step 232, the air conduit 160 is coupled around the heat sink 56 so as to be in fluid communication with the heat sink 56. In step 234, the power supply 64 is coupled to the air conduit 160 to be in fluid communication with the air conduit 160. In step 236, the light shroud assembly 60 is coupled to the body 90.

Figure 13:
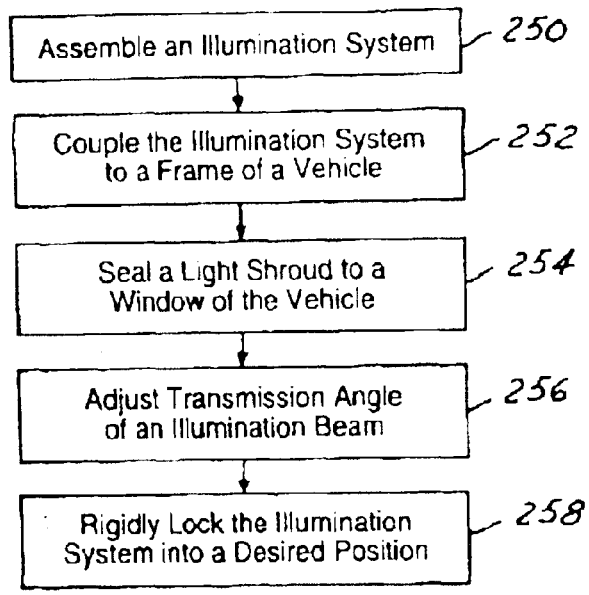
FIG. 13 is a logic flow diagram illustrating a method of installing the illumination system of FIGS. 3–5 within an interior cabin of a vehicle in accordance with an embodiment of the present invention.

Referring now to FIG. 13, a logic flow diagram illustrating a method of installing the illumination system 16 within the interior cabin 12 in accordance with an embodiment of the present invention is shown.

In step 250, the illumination system 16 is assembled. The illumination system 16 may be assembled using the method as described in the embodiment of FIG. 12.

In step 252, the illumination system 16 is coupled to the frame 180. The air conduit 160 is positioned into the overhead console bracket 182 and the alignment-mechanism 138 is fastened to the extension bracket 178. The extension bracket 178 and the support brackets 176 are coupled to the frame 180. In step 254, the light shroud of the illumination system 16 is sealed to the windshield 28. Steps 252 and 254 are intended to be performed simultaneously.

In step 256, the transmission angle of the illumination beam 20 of the illumination system 16 is adjusted by adjusting the body 90 relative to the U-bracket 152, as described above. In step 258, upon aligning or adjusting the transmission angle of the illumination system 16, the illumination system 16 is rigidly locked into a desired position.

Figure 14:
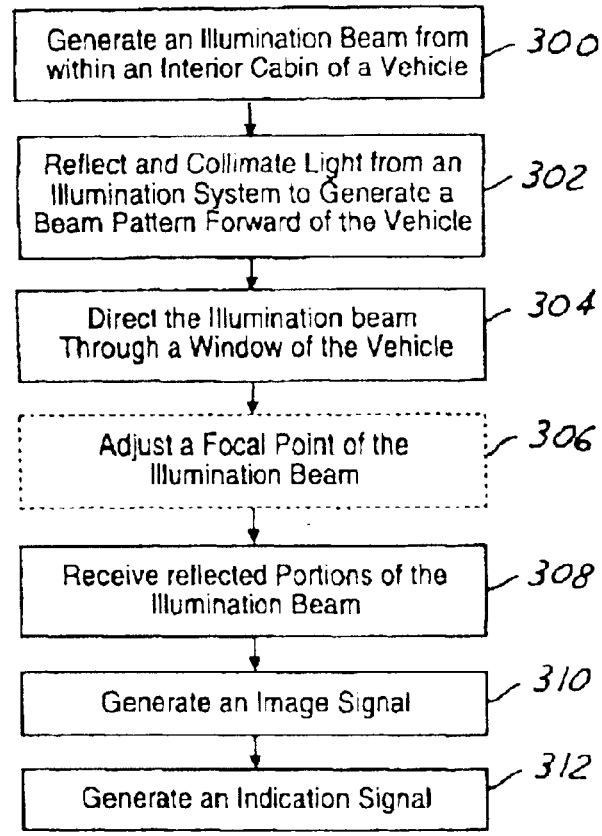
FIG. 14 is a logic flow diagram illustrating a method of operating the vision system in accordance with an embodiment of the present invention.

Referring now to FIG. 14, a logic flow diagram illustrating a method of operating the vision system 10 in accordance with an embodiment of the present invention is shown.

In step 300, the illumination system 16 generates the illumination beam 20 from within the interior cabin 12. In step 302, the illumination system 16 reflects and collimates light from the light source 72 to generate a beam pattern forward of the vehicle 14.

In step 304, the module 58 and the light shroud assembly 60 direct the illumination beam 20 through the windshield 28, thereby, illuminating the target area 24. The light shroud assembly 60, through use of the diffuser 148, may also diffuse the illumination beam 20 before being transmitted through the windshield 28.

In step 306, the emitted direction and focal point of the illumination beam 20 may be adjusted using the alignment-mechanism 138 and the focal point adjuster 174.

In step 308, the receiver system 18 receives reflected portions of the illumination beam 20 through the windshield 28. In step 310, the receiver system 18, in response to the reflected light at the desired wavelength, generates an image signal corresponding to detected objects within the target area 24. In step 312, the receiver controller 198 generates the indication signal in response to the image signal. In step 314, the indication signal is indicated to vehicle occupants via the indicator 26.

The above-described steps of FIGS. 12–14 are meant to be illustrative examples; the steps may be performed sequentially, synchronously, simultaneously, or in a different order depending upon the application.

The present invention provides an active night vision system that has both an illumination system and a receiver system located within an interior cabin of a vehicle. By having the illumination system and the receiver system located within the interior cabin, maintenance of the vision system is minimized and potential for damage and/or theft is also minimized. Also, temperature, humidity, and airflow extremes are no longer present or of a concern since the illumination system and the receiver system are located within the interior cabin. Environmental settings are easily maintained and thermal management of the illumination system is easily controlled. The compact design of the present invention may be easily packaged within various location of an interior cabin of the vehicle without obstructing the view of a vehicle occupant or affecting interior safety zones.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An illuminator system for an interior cabin of a vehicle comprising:
   at least one illuminator assembly comprising:
      a light source;
      a beam-forming optic optically coupled to said light source for forming an illumination pattern directed outside of the vehicle; and a housing supporting said beam-forming optic along a roofline and window perimeter of the vehicle;
   said illuminator assembly controlling operating temperature of said light source.

2. An assembly as in claim 1 further comprising a light coupler guiding light generated by said light source between said light source and said beam-forming optic.

3. A system as in claim 1 further comprising at least one heat sink in thermal communication with said light source.

4. A system as in claim 3 further comprising:
   an air conduit in fluid communication with said at least one heat sink; and
   a cooling fan in fluid communication with said air conduit and
   circulating air across said at least one heat sink.

5. A system as in claim 3 further comprising a thermal coupler in thermal communication with and aiding in thermal energy transfer between said light source and said at least one heat sink.

6. A system as in claim 1 further comprising a power supply energizing said light source.

7. A system as in claim 6 wherein said power supply comprises at least one heat sink.

8. A system as in claim 7 further comprising:
   an air conduit in fluid communication with said power supply; and
   a cooling fan in fluid communication with said air conduit.

9. A system as in claim 1 further comprising a focal point adjuster for adjusting a focal point of said illumination pattern.

10. A system as in claim 1 further comprising a component alignment-maintaining module for maintaining alignment of said light source with said beam-forming optic.

11. A system as in claim 1 further comprising a light shroud coupled between the illuminator assembly and a window of the vehicle.

12. A system as in claim 11 further comprising a light seal coupled between said light shroud and said window.

13. A system as in claim 1 further comprising a diffuser for diffusing light generated from said light source.

14. A system as in claim 1 further comprising an alignment-mechanism coupled to said housing and aligning said illumination pattern.

15. A system as in claim 14 wherein said alignment-mechanism couples said housing to a roof structure of the vehicle.

16. A system as in claim 1 further comprising an overhead console bracket coupling said housing to a roof structure of the vehicle.

17. A system as in claim 1 further comprising:
   a temperature sensor sensing temperature of said light source and
   generating a temperature signal; and
   a heater for increasing the temperature of said light source in response to said temperature signal.

18. A system as in claim 17 further comprising a controller coupled to said temperature sensor and to said heater and adjusting the temperature of said light source in response to said temperature signal.

19. A system as in claim 18 wherein said controller is an integral part of a power supply.

20. A system as in claim 1 wherein said light source is a near infrared light source.

21. A system as in claim 1 wherein said light source is a diode laser.

22. A system as in claim 1 wherein said beam-forming optic is a collimating optic.

23. A system as in claim 1 wherein said housing directs said illumination beam through a wiper-zone of the vehicle.

24. A system as in claim 1 configured to be mounted in close proximity to a receiver.

25. An illuminator system for an interior cabin of a vehicle comprising:
   a light source;
   a beam-forming optic optically coupled to said light source for forming an illumination pattern directed outside of the vehicle;
   a housing supporting at least a portion of said light source and said beam-forming optic along a roofline of the vehicle to transmit said illumination beam through a window of the vehicle;
   a power supply coupled to and energizing said night vision illuminator; and
   at least one heat sink in thermal communication with said light source and said power supply; and
   an illuminator assembly providing a temperature controlled operating environment for said light source.

* * * * *